A. E. KENNEY.
VALVE.
APPLICATION FILED SEPT. 25, 1906.
923,274.
Patented June 1, 1909.
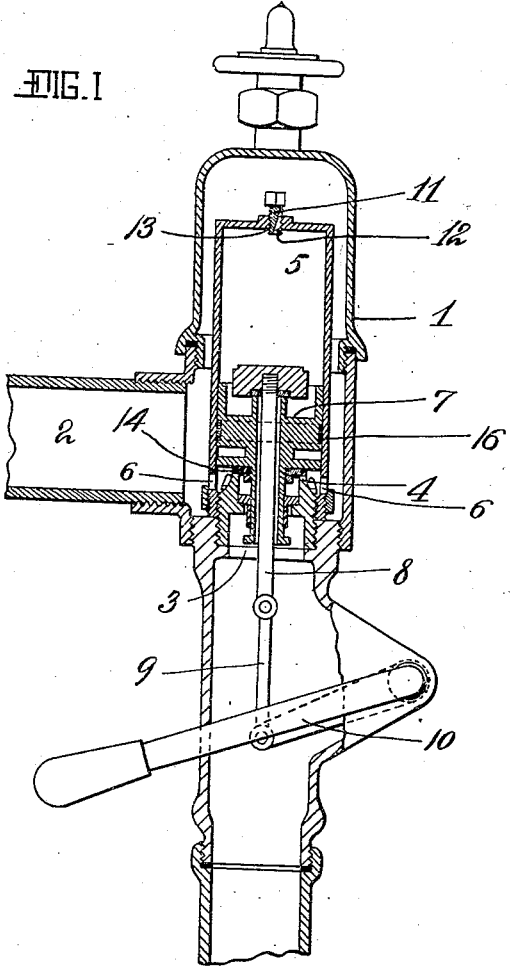
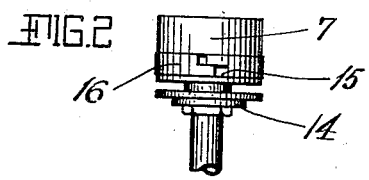
WITNESSES:
Andrew E. Kenney INVENTOR
BY
ATTORNEY

UNITED STATES PATENT OFFICE.

ANDREW E. KENNEY, OF NORTH PLAINFIELD, NEW JERSEY.

VALVE.

No. 923,274.  Specification of Letters Patent.  Patented June 1, 1909.

Application filed September 25, 1906. Serial No. 336,087.

*To all whom it may concern:*

Be it known that I, ANDREW E. KENNEY, a citizen of the United States of America, and a resident of borough of North Plainfield, county of Somerset, State of New Jersey, have invented certain new and useful Improvements in Valves, of which the following is a specification.

The present invention relates to valves, and has more particularly reference to gravity valves—such as are known in the trade as "flushometers", and which are intended to replace the unsightly tanks now commonly used for closets.

These valves are required to work under many varying conditions—such as difference in the water pressure, etc., and must be capacited to be regulatable to supply a varying volume of water in a given time according to local ordinances.

As the closing of the valve depends upon gravity it will be obvious that the fall of the piston which closes the valve is affected by irregularities and imperfections in the casting of the parts. And although means have been provided for varying the ratio of fall of the piston, such means have never been effective on account of the fact that no constant ratio of fall has ever been possible, owing to the said imperfections.

The object of the present invention is to produce means whereby a constant ratio of fall can be obtained as a reliable basis on which to vary the ratio of fall to suit local conditions.

In carrying out the object of the invention I employ a resilient member of non-compressible material on the piston, making constant frictional engagement with the wall of the cylinder, notwithstanding irregularities in the frictional contact of said cylinder and piston, thereby causing said piston to drop at a constant ratio of speed during its period of descent.

In the accompanying drawings the invention is embodied in a concrete form, and Figure 1 is a vertical sectional view of a valve embodying my invention. Fig. 2 is a detail view of the elastic member shown in position on the piston.

Similar characters of reference indicate corresponding parts in the several views.

1 indicates a valve casing of any suitable construction in free communication with the inlet 2. At the lower end of the said valve casing is an outlet 3 having the valve seat 4.

Located within the said casing is a cylinder 5 having the perforations 6 adjacent to the valve seat. Working within the said cylinder is a piston 7 connected by means of the rod 8 and link 9 to the pivoted operating lever 10. At the upper end of the cylinder is the valve 11 which consists of a screw having a cut-away portion 12. The screw is in threaded engagement with the aperture 13, so that by adjusting the said screw the opening from the cylinder into the valve casing may be increased or diminished. By adjusting this screw the piston will drop faster or slower as circumstances may require and more or less water supplied, inasmuch as the water will pass slower or quicker from the casing into the cylinder.

The piston 7 is provided with a packing ring 14 which closes the valve seat 4. The piston 7 is further provided with one or more circumferential grooves 15 in each of which is placed a resilient member or ring 16 of non-compressible material. This ring will maintain a constant frictional contact with the walls of the cylinder notwithstanding any irregularities, and will thereby insure a constant ratio of fall of the piston. This constant ratio can then be varied by adjusting the screw 11.

What I claim is:

A gravity valve comprising a cylinder having a valve seat, a falling piston in said cylinder having a valve member adapted to engage with the valve seat to close the valve when the piston has moved downward a predetermined distance, means for lifting the piston to open the valve, a resilient member of non-compressible material on the piston making constant frictional engagement with the wall of the cylinder, notwithstanding irregularities in the frictional contact of said cylinder and piston, for causing said piston to drop at a constant ratio of speed during its period of descent, and means for varying the total length of time required for the piston to complete its movement of descent.

Signed at New York city this 21 day of September, 1906.

ANDREW E. KENNEY.

Witnesses:
 GEO. E. KENNEY,
 CHAS. SWEENEY.